United States Patent [19]

Marincic

[11] 3,907,593
[45] Sept. 23, 1975

[54] ELECTROCHEMICAL CELLS
[75] Inventor: Nikola Marincic, Winchester, Mass.
[73] Assignee: GTE Laboratories Incorporated, Waltham, Mass.
[22] Filed: May 17, 1974
[21] Appl. No.: 470,890

[52] U.S. Cl. .................. 136/7; 136/19; 136/36; 136/134 R; 136/74
[51] Int. Cl.² ...................................... H01M 35/00
[58] Field of Search .......... 136/7, 6 A, 6 C, 19, 36, 136/74, 83, 100, 134

[56] References Cited
UNITED STATES PATENTS

| | | | |
|---|---|---|---|
| 2,654,794 | 10/1953 | Zaugg | 136/7 |
| 3,116,172 | 12/1963 | Wilke et al. | 136/134 P X |
| 3,245,837 | 4/1966 | Ikeda et al. | 136/134 P |
| 3,536,532 | 10/1970 | Watanabe et al. | 136/121 X |
| 3,578,500 | 5/1971 | Maricle et al. | 136/6 LN |
| 3,666,560 | 5/1972 | Cairns et al. | 136/6 C |
| 3,796,606 | 3/1974 | Lehmann et al. | 136/134 X |

Primary Examiner—John H. Mack
Assistant Examiner—C. F. Lefevour
Attorney, Agent, or Firm—Irving M. Kriegsman

[57] ABSTRACT

Electrochemical cells having an alkali metal anode, a carbon or $(C_4F)_n$ cathode, and an electrolyte, comprising a solute dissolved in an inorganic oxyhalide or thiohalide solvent, between and in contact with the anode and cathode. The cathode material, which catalyzes the electrochemical decomposition of the solvent, is present as a composite structure wherein a metallic screen is coated on both sides thereof with the cathode material. The screen is so positioned that sharp spikes at the ends thereof cut into the walls of the can thereby maintaining positive electrical and structural contact. The invention is particularly related to the use of the composite cathode structure in flat, button-type cells since assembly of such cells using a prefabricated cathode composite disc, is readily facilitated.

19 Claims, 4 Drawing Figures

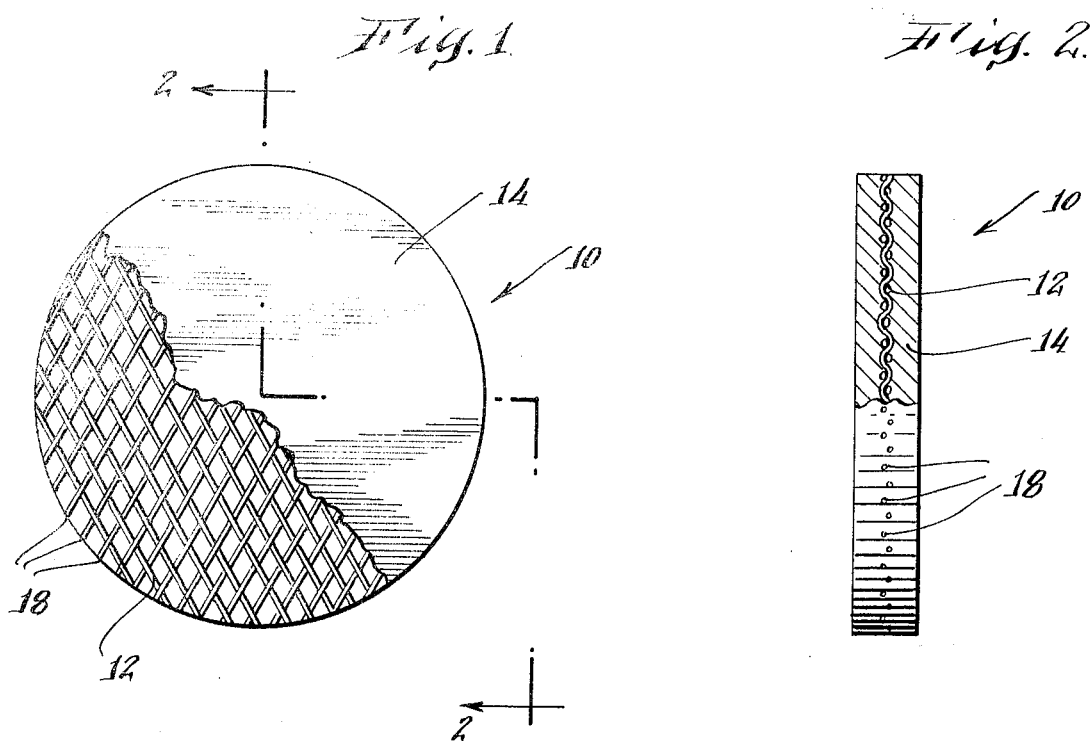
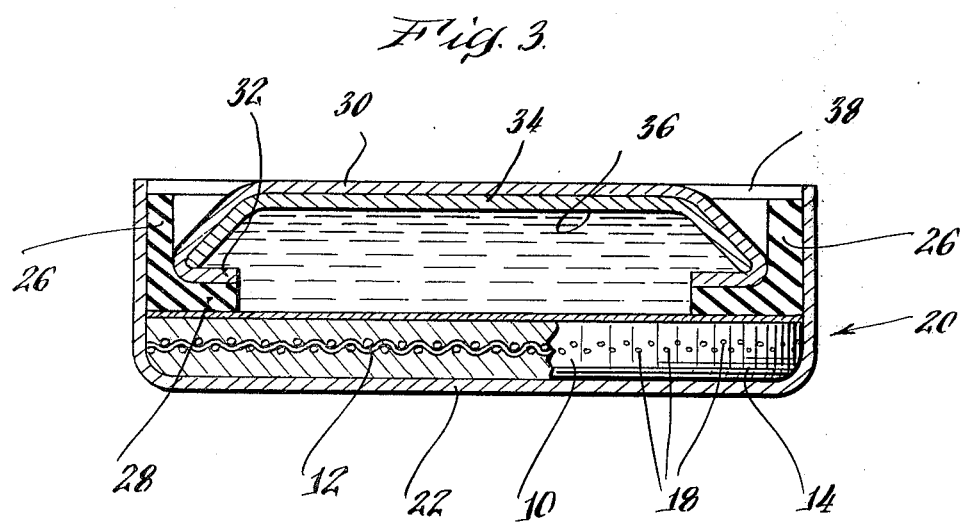

ELECTROCHEMICAL CELLS

FIELD OF THE INVENTION

This invention relates to electrochemical cells. More particularly, it relates to flat, button-type electrochemical cells having a composite cathode structure wherein the cathode material is coated onto both sides of a porous screen support.

CROSS-REFERENCE TO RELATED APPLICATIONS

This application is related to copending application Ser. No. 305,813 filed Nov. 13, 1972, which describes electrochemical cells having an oxidizable active anode material, such as lithium, a cathode having carbon as the active cathode component, and an electrolyte comprising an inorganic oxyhalide or thiohalide solvent and a solute dissolved therein. This application is also related to copending application Ser. No. 305,796, also filed Nov. 13, 1972, which describes similar cells wherein the cathode material, instead of being carbon, comprises an intercalation compound of carbon and fluorine of the general formula $(C_4F)_n$. As set forth therein, it has been found that the aforementioned cathode materials catalyze the electrochemical decomposition of the solvent during discharge of the cell, thereby enabling the otherwise "dead" weight of the electrolyte solvent to be utilized as a source of electrical energy.

BACKGROUND OF THE INVENTION

Most of the button-type electrochemical cells made today use pelletized cathodes of mercuric oxide, silver oxide, or manganese dioxide, combined with various types of anodes in an alkaline electrolyte. The pellet-type cathodes are either dropped into the metallic housings (i.e., cans) utilized or consolidated with the cans for better contact with the can walls. Single cells of this type exhibit voltages up to about 1.5 volts and can realize various energy densities depending on the particular choice of active components (i.e., cathode, anode and electrolyte). It would be desirable to have button-type electrochemical cells having a carbon or $(C_4F)_n$ cathode and an alkali metal (e.g., lithium) anode, but early attempts to produce such cells were unsuccessful as the cells did not operate satisfactorily due to insufficient porosity of the pressed cathode (e.g., carbon) and poor contact with the cell can.

OBJECTS OF THE INVENTION

It is, therefore, the primary object of this invention to provide a novel electrochemical cell.

It is a further object of this invention to provide a novel flat, button-type electrochemical cell.

It is a further object of this invention to provide an electrochemical cell, particularly of the flat, button-type, which has a screen-type cathode support in firm contact with the cell can.

It is a further object of this invention to provide an electrochemical cell, particularly of the flat, button-type, which has a carbon or $(C_4F)_n$ cathode material coated onto a screen-type cathode support which is in positive electrical and mechanical contact with the cell can.

The above and still further objects, features and advantages of the present invention will become apparent upon consideration of the following detailed disclosure.

SUMMARY OF THE INVENTION

These and still further objects of the present invention are achieved, in accordance therewith, by providing an electrochemical cell, particularly of the flat, button-type, having an alkali metal anode, a carbon or $(C_4F)_n$ cathode, and an electrolyte, comprising a solute dissolved in an inorganic oxyhalide or thiohalide solvent, between and in contact with the anode and cathode. The cathode material, which catalyzes the electrochemical decomposition of the solvent, is present as a composite structure wherein a metallic screen is coated, on both sides thereof, with the cathode material. The screen is so positioned that the sharp spikes at the ends thereof cut into the walls of the cell housing (i.e., can) and maintain positive electrical and structural contact.

The anode is an oxidizable material and preferably is lithium metal. Other anode materials include sodium, potassium, etc. The anode may be constructed of the oxidizable material in contact with a suitable supporting metal grid. The grid for a lithium anode, for example, can be made of nickel, nickel alloys, (such as Monel), stainless steel, silver or platinum.

The cathode material is preferably carbon, such as graphite, carbon black, or acetylene black, or an intercalation compound of carbon and fluorine represented by the general formula $(C_4F)_n$ where n refers to the presence of a large, but indefinite, number of recurring $(C_4F)$ groups in the intercalation compound. The $(C_4F)_n$ cathode material can be utilized in combination with carbon (e. g., graphite or carbon black) or $(CF)_n$. When admixed with $(CF)_n$, the intercalation compound will have an average or representative formula $(C_xF)_n$ where $x$ is greater than 1 and less than 4. Such intercalation compounds are considered mixtures of $(C_4F)_n$ and $(CF)_n$ in proportions which give the particular value of $x$. As indicated above, however, carbon is the presently preferred cathode material. These cathode materials catalyze the electrochemical reduction of the electrolyte solvent upon the surface thereof so the otherwise "dead" weight of the solvent, in combination with the oxidizable anode material, can be utilized as a source of electrical energy.

As used throughout this specification and claims, reference to a particular anode or cathode material shall mean the electrochemically active component of the anode structure of the cathode surface upon which electrochemical reduction of the solvent takes place, respectively. The electrochemically active component may be in contact with, or form a part of, a suitable substrate which further defines the total electrode structure.

The complete cathode structure comprises a metallic screen coated with the cathode material [e.g., carbon or $(C_4F)_n$] on each side thereof to thereby form a composite in which the cathode layers are firmly held to the screen and interconnected through the openings in the screen. Individual composite cathode structures can be prepared; preferably, however, individual, round cathode discs are punched out of a larger flat sheet of the composite material. When placed in the bottom of the cell can, the sharp spikes at the ends of the cathode screen cut into the adjacent walls of the cell can, thereby maintaining positive mechanical and electrical contact by the spring action of the contracted screen. To achieve this result, it is necessary to properly select the diameter of the cathode disc with respect to the internal diameter of the adjacent portion of the cell can. For example, to achieve the desired spring-type contact, the cathode discs can be made of a diameter equal to, or just slightly larger than, the internal diameter of the can, and then force fitted to the bottom of the can.

The openings in the screen should be sufficiently large to permit adequate transport of the cell electrolyte between the two layers of the cathode material coated on opposite sides of the screen. This enables an unobstructed utilization of the cathode material (e.g., the carbon) on both sides of the screen in the course of the discharge reaction in the cell. Suitable screen sizes include those from about 30 mesh to about 360 mesh, with nonwoven screens (e.g., of the Exmet-type where holes are punched or formed in metal layers) being presently preferred to the woven types. The cathode material (for example, carbon) is made to be about 85 to about 90% porous, so as not to adversely impede electrolyte transfer, and is in good electrical contact with the cell can via the screen on which it is supported.

As indicated above, individual cathode discs can be prepared from a larger flat sheet of the composite material. The discs so prepared are particularly suitable for use in flat, button-type cells since, upon proper positioning of the disc in the cell, no further electrical contacts or mechanical supports are required. Thus, fabrication of the cells is less complex, with less chance for failure during the lifetime of the cell.

As indicated above, the electrolytic solution comprises a liquid covalent inorganic oxyhalide or thiohalide solvent and a solute dissolved therein. Applicable solvent materials include phosphorus oxychloride, monofluorophosphoryl dichloride, monobromophosphoryl difluoride, monofluorophosphoryl dibromide, thiophosphoryl chloride, thionyl chloride, thionyl bromide, sulfuryl choride, monofluorothiophosphoryl dichloride, monofluorothiophosphoryl dibromide, monobromothiophosphoryl difluoride, and mixtures thereof.

It is preferred that the solvent be dried (or at least partially dried) prior to use. With regard to phosphorus oxychloride, for example, this is accomplished by boiling the solvent material with clean lithium metal for twelve hours at room temperature under an argon atmosphere. The solvent is then distilled at atmospheric pressure and the material which boils between 105°C and 106°C collected. The solvent thus prepared has a specific conductance of less than $7 \times 10^{-7}$ Mhos/cm. Other solvents can be dried in an analogous manner (with solvent collection being at or about the boiling point of the particular material), or by techniques known in the art. Since these solvents are electrochemically reducible, but otherwise relatively non-reactive, and the reaction products of such reduction are relatively non-reactive, cells can be constructed with a wide range of anode and cathode materials, particularly anode materials which themselves are highly reactive, such as, for example, lithium.

The typical solute provides at least one anion of the general formula $X^-$, $MX_4^-$, $M'X_6^-$, and $M''Cl_6^=$, where M is an element selected from the group consisting of aluminum and boron; M' is an element selected from the group consisting of phosphorus, arsenic and antimony, M'' is an element selected from the group consisting of tin, zirconium, and titanium; and X is a halogen. Examples of suitable solutes yielding anions $MX_4^-$ are: tetrachloroaluminates ($AlC_4^-$), tetrabromoaluminates $AlBr_4^-$), tetrachloroborates ($BCl_4^-$), and tetrafluoroborates ($BF_4^-$). Examples of solutes yielding anions $M'X_6^-$ are: hexafluorophosphates ($PF_6^-$), hexafluoroarsenates ($AsF_6^-$), hexafluoroantimonates ($SbF_6^-$) and hexachloroantimonates ($SbCl_6^-$). Examples of solutes yielding anions $M''Cl_6^=$ are: hexachlorostannates ($SnCl_6^=$), hexachlorozirconates ($ZrCl_6^=$) and hexachlorotitanates ($TiCl_6^=$). Solutes yielding a halogen anion, particularly chlorides ($Cl^-$), bromides ($Br^-$), and iodides ($I^-$), and solutes providing one of the anions dichloroiodates ($ICl_2^-$), dichlorophosphates ($PO_2Cl_2^-$), perchlorates ($ClO_4^-$) and chlorosulfates ($SO_3Cl^-$) are also contemplated within the scope of this invention.

The solute also provides at least one cation. This cation may be of an alkali metal, such as lithium, sodium, potassium, cesium, and rubidium; and alkaline earth metal, such as magnesium, calcium, strontium, and barium; or a lanthanide rare earth element, such as lanthanum, terbium, neodymium, cerium, europium and samarium. Cations having the following general formula $R_4N^+$, where R is a radical selected from the group consisting of methyl, ethyl, propyl, isopropyl, butyl and isobutyl are also contemplated to be suitable for use in this invention. Examples of suitable cations are: tetramethylammonium $(CH_3)_4^+$, tetraethylammonium $(C_2H_5)_4N^+$, tetrapropylammonium $(C_3H_7)_4N^+$, and tetrabutylammonium $(C_4H_9)_4N^+$. These cations may be added as the tetraalkylammonium chloride, for example. Other cations contemplated within the scope of this invention are those resulting from solvent dissociation such as phosphorus oxydichloride ($POCl_2^+$) in the case of a phosphorus oxychloride-based electrolytic solution, $SOCl^+$, and $SO_2Cl^+$, etc.

The solute for a particular cell can be chosen to yield a combination of any of the anions and cations listed above; however, the electrolyte must contain at least $10^{-3}$ moles per liter of cation and at least $10^{-3}$ moles per liter of anion. Preferably, at least $10^{-1}$ moles per liter of cation and at least $10^{-1}$ moles per liter of anion are present.

Solutes having lithium cations and large anions which are stable to oxidation and reduction are particularly desirable. The preferred lithium compounds are: lithium tetrachloroaluminate, lithium tetrachloroborate, lithium tetrafluoroborate, lithium hexafluorophosphate, lithium hexafluoroarsenate, lithium hexafluoroantimonate, lithium hexachlorostannate, lithium hexachlorozirconate, lithium hexachlorotitanate and lithium chlorosulfate. Other preferred compounds are Lewis acids, particularly aluminum chloride ($AlCl_3$), boron trichloride ($BCl_3$), boron fluoride ($BF_3$), tin chloride ($SnCl_4$), antimony chloride ($SbCl_5$), antimony fluoride ($SbF_5$), titanium chloride ($TiCl_4$), aluminum bromide ($AlBr_3$), phosphorus fluoride ($PF_5$), phosphorus chloride ($PCl_5$), arsenic fluoride ($AsF_5$), arsenic chloride ($AsCl_5$), zinc chloride ($ZnCl_2$) and zirconium chloride ($ZrCl_4$), in conjunction with a metal halide such as lithium chloride. In addition, Lewis bases having the general formula $A_mB_n$ where A is an element selected from the group consisting of lithium, sodium, potassium, rubidium, cesium, magnesium, calcium, strontium, barium and the rare earths and B is an element selected from fluorine, chlorine, bromine, iodine and oxygen are also useful. Included in this latter category are cesium chloride, rubidium chloride, and barium chloride.

The required anion and cation may be formed as a result of a chemical reaction directly with a solvent. For example, the Lewis acid $AlCl_3$ will react with the solvent $POCl_3$ to yield the anion $AlCl_4^-$. The anion and cation may also be formed as the result of the reaction of a Lewis acid with a Lewis base dissolved in the solvent. For example, lithium chloride, LiCl, a Lewis base, will react with $AlCl_3$ to form $LiAlCl_4$ which dissociates in part to solvated $Li^+$ and $AlCl_4^-$.

Although not required for the cells of this invention, a suitable separator can be employed to insulate the anode and cathode current collector materials when no electrical current flows through the external circuit. A separator prevents the mechanical and electrical contact between the cathode current collector material and the anode. A wise variety of ceramic and plastic materials having small pore sizes are available. Examples of such materials include alumina, beryllia, titania, porcelain, porous glass, fritted glass, glass mat, nonwoven porous polytetrafluoroethylene and other fluorinated polymers, polypropylene and polyethylene.

BRIEF DESCRIPTION OF THE DRAWINGS

FIG. 1 is a top view, partially cut away, of the composite cathode sructure of the present invention;

FIG. 2 is a cross-sectional view of the composite cathode structure of FIG. 1, taken along lines 2—2; and FIG. 3 is a cross-sectional view of a button-type electrochemical cell incorporating the composite cathode structure of FIG. 1, before the cell is closed.

Referring to FIGS. 1 and 2, there is shown a composite cathode structure 10 having a metallic screen 12 coated on each side thereof with cathode material 14. Edges 18 of the screen form spikes which make positive electrical and mechanical contact with the walls of the cell can when in place within the cell.

Referring to FIG. 3, there is shown a flat, button-type electrochemical cell 20 having a cell can 22 in which the other components of the cell are placed and/or housed. The composite cathode structure 10 of FIG. 1, including screen 12 and cathode material 14, is placed in the bottom of can 22 in such a manner that spikes 18 of screen 12 make, and maintain, the desired contact with the internal side walls of the can. Thus, in these cells, the can 22 is the external cathode contact. Overlying the composite cathode structure is a separator 24 which serves to separately maintain the anode and cathode compartments of the cell. Supported on top of separator 24 adjacent the upper, inner surfaces of can 22 is an insulating gasket 26 having a flat portion 28, parallel to the top and bottom of the can, which supports anode contact 30. Anode contact 30 is bent back (on both sides thereof) toward the center of the cell to define portions 32 thereof which are supported by flat portions 28 of gasket 26. The active anode material (e.g., lithium) 34 is bonded or attached to, or otherwise in positive mechanical and electrical contact with external anode contact 30. This contact may be, in part, assisted by bent-back portions 32 of external anode contact 30. Between anode 34 and separator 24 is electrolyte compartment 36 which receives the inorganic oxyhalide- or thiohalide-based electrolyte described above. Cap 38 completes the cell structure; and can and cap being suitably bent or crimped (not shown) to completely seal the cell for storage and use.

DESCRIPTION OF SPECIFIC EMBODIMENTS

Figure 4:
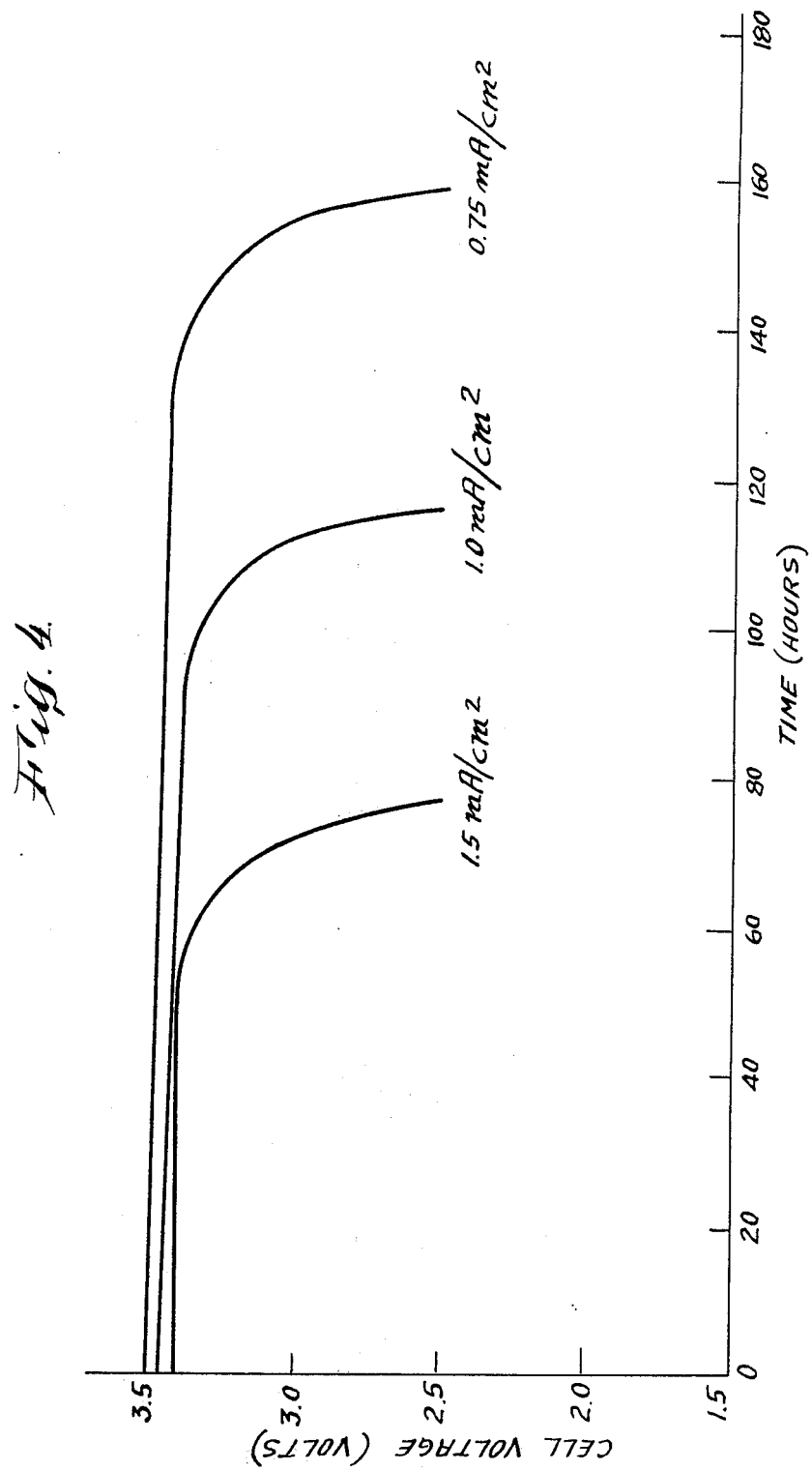
FIG. 4 is a chart showing the discharge curves for the cell of Example II when discharged at different rates.

The following Examples are given to enable those skilled in the art to more clearly understand and practice the present invention. They should not be considered as a limitation of the scope of the invention but merely as being illustrative and representative thereof.

EXAMPLE I

A flat, button-type electrochemical cell is fabricated from an 8 mil thick stainless steel can, 0.450 inch in diameter and 0.135 inch high. A No. 5 Nil2-1/0 (5 mil thick) expanded nickel screen (from Exmet Corp., Bridgeport, Conn.) is coated on each side thereof with a 20 mil thick layer of cathode material comprising 85% acetylene black (50% compressed, Shawinigan Products Co., Englewood Cliffs, New Jersey), 10% graphite and 5% polytetrafluoroethylene binder. A cathode disc of 0.450 inch diameter is punched out from the preformed composite structure and placed in the bottom of the stainless steel can. A 5 mil thick glass mat separator, also of 0.450 inch diameter, is placed over the cathode disc. A gasket formed of Kel-F (a fluorinated polymer available from Kellogg Co., New York, New York) is placed on the separator adjacent the inside perimeter of the can. The electrolyte comprising 1.8 M lithium tetrachloroaluminate in thionyl chloride is added to the cell. The anode, a 15 mil thick lithium foil pressed into a No. 5 Nil2-1/0 (5 mil thick) expanded nickel screen, previously welded to the inside surface of an 8 mil thick stainless steel cap, is positioned on the gasket, and the cap is secured to the cell can. When discharged, this cell exhibits about 63 miliamphours at an average voltage of about 3.47 volts, resulting in about 216.5 milliwatt hours of energy. This is contrasted with commercial mercuric oxide-zinc cells of the same size (e.g., Everready 343) rated at 110 milliamphours which, at an average discharge voltage of 1.25 volts, deliver 137 milliwatt hours of energy, or about one-third less energy than the cells of this Example. Cathode surface area is about 1 $cm^2$.

EXAMPLE II

Example I is repeated using a cell can of the same diameter, but 0.200 inch high (i.e., a can having the physical size of the Mallory RM 675 primary mercury battery). In the cell of this Example, the anode is 20 mil thick, the cathode material is 60 mil thick, and the cell, because of its larger size, includes more electrolyte than the cell of Example I. The cell was discharged at three different discharge rates. When discharged at a 1 milliamp rate, cell discharge above 3 volts lasted about 110 hours at an average discharge voltage of 3.45 volts. The total energy delivered was 375.5 milliwatt hours. In contrast, the rated energy output of the Mallory RM 675 is 234 milliwatt hours; thus, the cell of the Example realizes a 47% improvement in energy output over the aforementioned cell of the same size.

When the cell of this Example was discharged at a 1.5 milliamp rate, cell discharge above 3 volts lasted about 75 hours, and when discharged at a 0.75 milliamp rate, cell discharge above 3 volts lasted about 150 hours.

This Example additionally illustrates an advantageous property of the cells of this invention, namely that the substantially majority (i.e., 80% or so) of the useful lives thereof are above 3 volts at a relatively constant discharge voltage. For example, when discharged at the 1 milliamp rate, cell discharge voltage remains essentially constant at about 3.4 volts for about 95 hours of the total cell useful life of about 115 hours. This property is advantageous where essentially constant voltages of this magnitude are desired over long periods of actual use.

The discharge curves described above are shown in FIG. 4.

While the present invention has been described with reference to specific embodiments thereof, it will be understood by those skilled in this art that various changes may be made without departing from the true spirit and scope of the invention. In addition, many modifications may be made to adapt the particular situation, material, need, apparatus, process or then-present objective to the spirit of the present invention without departing from its essential teachings.

What is claimed is:

1. An electrochemical cell comprising a housing; a solid oxidizable active anode material within said housing but not in electrical contact therewith; a composite cathode structure within said housing comprising a foraminous metallic screen coated with a solid, porous cathode material said screen having sharp spikes at the ends at the perimeter thereof which cut into the walls of said housing thereby making firm mechanical and electrical contact therewith whereby said housing can be used as the external cathode contact of said cell; and an electrolyte between and in contact with said anode material and said composite cathode structure; said cathode material being sufficiently porous to permit electrolyte transfer therethrough.

2. The cell of claim 1 further including a separator between said anode material and said composite cathode structure.

3. The cell of claim 1 wherein said composite cathode structure is tightly fitted into said housing to thereby ensure said firm mechanical and electrical contact without need for further mechanical support or electrical contacts.

4. An electrochemical cell comprising a housing; a solid oxidizable active anode material within said housing but not in electrical contact therewith; a composite cathode structure within said housing comprising a foraminous metallic screen coated on the top and bottom surfaces thereof with a solid, porous cathode material, said screen having sharp spikes at the ends at the perimeter thereof which cut into the walls of said housing thereby making firm mechanical and electrical contact therewith, whereby said housing can be used as the external cathode contact of said cell; and an electrolyte between and in contact with said anode material and said composite cathode structure, said electrolyte comprising an inorganic, electrochemically reducible oxyhalide or thiohalide solvent and a solute dissolved therein, said solvent being electrochemically reduced upon the surface of said cathode material during operation of said cell, whereby said solvent material in conjunction with said oxidizable anode material is utilized as a source of electrical energy; said cathode material being sufficiently porous to permit electrolyte transfer therethrough.

5. The cell of claim 4 wherein said composite cathode structure is tightly fitted into said housing to thereby ensure said firm mechanical and electrical contact without need for further mechanical support or electrical contacts.

6. The cell of claim 4 wherein said oxidizable anode material is an alkali metal.

7. The cell of claim 4 wherein said oxidizable anode material is lithium.

8. The cell of claim 4 wherein said cathode material is porous carbon.

9. The cell of claim 4 wherein said cathode material includes $(C_4F)_n$ where n refers to a large, but indefinite, number of recurring $(C_4F)$ groups in said cathode material.

10. The cell of claim 4 wherein said foraminous metallic screen is from about 30 mesh to about 360 mesh.

11. The cell of claim 4 wherein said solvent is an oxyhalide or a thiohalide of phosphorus or an oxyhalide of sulfur.

12. The cell of claim 4 wherein said solvent is selected from the group consisting of phosphorus oxychloride, monofluorophosphoryl dichloride, monobromophosphoryl difluoride, monofluorophosphoryl dibromide, thiophosphoryl chloride, thionyl chloride, thionyl bromide, sulfuryl chloride, monofluorothiophosphoryl dichloride, monofluorothiophosphoryl dibromide, monobromothiophosphoryl difluoride, and mixtures thereof.

13. The cell of claim 4 wherein said solvent is thionyl chloride, sulfuryl chloride or mixtures thereof.

14. The cell of claim 4 wherein said inorganic solvent is the sole oxidant material and sole solvent material in said cell.

15. The cell of claim 4 wherein said solute provides at least one anion having the formula $X^-$, $MX_4^-$, $M'X_6^-$, and $M''X_6^=$, where M is an element selected from the group consisting of aluminum and boron; M' is an element selected from the group consisting of phosphorus, arsenic and antimony; M'' is an element selected from the group consisting of tin, zirconium and titanium; and X is a halogen; said solute further providing at least one cation selected from the group consisting of alkali metals, the alkaline earth metals, the lanthanides, $POCl_2^+$, $SOCl^+$, $SO_2Cl^+$, and $R_4N^+$, where R is a radical selected from the group consisting of methyl, ethyl, propyl, isopropyl, butyl and isobutyl.

16. The cell of claim 4 wherein said solute includes a Lewis acid.

17. The cell of claim 4 further including a separator between said anode material and said composite cathode structure.

18. The cell of claim 4 wherein one of the products of the discharge of said cell is the halide of said active anode material, the halogen in said halide originating from said inorganic solvent material.

19. The cell of claim 4 wherein said anode material is lithium; said cathode material is carbon; said inorganic solvent is thionyl chloride, sulfuryl chloride or a mixture thereof; and said solute is lithium tetrachloroaluminate or antimony pentachloride.

* * * * *